United States Patent [19]

Gonser et al.

[11] Patent Number: 5,408,413

[45] Date of Patent: Apr. 18, 1995

[54] APPARATUS AND METHOD FOR CONTROLLING AN OPTIMIZING AIRCRAFT PERFORMANCE CALCULATOR TO ACHIEVE TIME-CONSTRAINED NAVIGATION

[75] Inventors: John M. Gonser; Richard J. Kominek, both of Albuquerque, N. Mex.

[73] Assignee: Honeywell Inc., Minneapolis, Minn.

[21] Appl. No.: 101,215

[22] Filed: Aug. 3, 1993

[51] Int. Cl.$^6$ .............................................. G06F 15/50
[52] U.S. Cl. .................................. 364/446; 364/440; 364/442; 244/182
[58] Field of Search ............... 364/446, 442, 444, 440, 364/431.07, 424.06, 431.01, 428; 244/181-183, 189, 76 R

[56] References Cited

U.S. PATENT DOCUMENTS

| | | | |
|---|---|---|---|
| 4,153,874 | 5/1979 | Kaestner | 324/161 |
| 4,312,041 | 1/1982 | DeJonge | 364/442 |
| 4,642,775 | 5/1985 | Cline et al. | 364/444 |
| 4,760,530 | 7/1988 | Liden | 364/442 |
| 4,774,670 | 9/1988 | Palmieri | 364/446 |
| 4,811,230 | 3/1989 | Graham et al. | 364/428 |
| 5,051,910 | 9/1991 | Liden | 364/446 |
| 5,070,458 | 12/1991 | Gilmore et al. | 364/424.06 |
| 5,121,325 | 6/1992 | DeJonge | 364/442 |

Primary Examiner—Kevin J. Teska
Assistant Examiner—Stephen J. Walder, Jr.
Attorney, Agent, or Firm—Craig J. Lervick; Arnold L. Albin

[57] ABSTRACT

A Flight Management System for aircraft whereby time-constrained flight can be achieved while maintaining predetermined input parameters selected for minimizing cost of flight, wherein arbitrary points in the flight plan can be designated as time-constraint points, and wherein flight segments can be arbitrarily selected for exclusion from any speed variation. A speed generator derives an initial speed schedule for each segment of a flight plan from inputs of a predetermined cost index, the flight plan, and aircraft performance parameters. The speed schedule is modified by wind data, constant speed segments, and predetermined speed limits. When applied to a profile generator an estimated time of arrival is computed, as well as predicted distance and velocity values for each segment of flight. The predicted values are used to compute a total time of arrival. When compared with a given arrival constraint time and the estimated time of arrival, a speed correction factor is derived which, when fed back to the profile generator, results in adjusting the estimated time of arrival to coincidence with the arrival constraint time.

(Abstract continued on next page.)

TABLE 1

Original Flight Plan for TNAV Test

| SEGDIST NAUT. MI. | SEGSPD KNOTS | CSS | ETA HHMM.M | RTA HHMM.M |
|---|---|---|---|---|
| 10.0 | 230.0 | | 0002.6 | |
| 10.0 | 245.0 | | 0005.1 | |
| 35.0 | 270.0 | CSS | 0012.8 | |
| 100.0 | 280.0 | | 0034.3 | |
| 20.0 | 290.0 | CSS | 0038.4 | |
| 70.0 | 300.0 | CSS | 0052.4 | |
| 400.0 | 300.0 | | 0212.4 | |
| 200.0 | 310.0 | | 0251.1 | |
| 200.0 | 280.0 | | 0334.0 | |
| 100.0 | 275.0 | | 0355.8 | |
| 35.0 | 275.0 | | 0403.4 | |
| 100.0 | 280.0 | | 0424.9 | |
| 20.0 | 290.0 | | 0429.0 | |
| 70.0 | 300.0 | | 0443.0 | |
| 400.0 | 300.0 | | 0603.0 | 0528.0 |
| 200.0 | 310.0 | | 0641.7 | |
| 200.0 | 240.0 | | 0731.7 | |
| 100.0 | 240.0 | | 0756.7 | |
| 50.0 | 235.0 | | 0809.5 | |

SEGDIST = Distance of the flight plan segment (leg)
SEGSPD = Speed to be used in the flight plan segment
CSS = Constant Speed Segment
RTA HOURS = Requested time of arrival, in hours elapsed since start of flight

TABLE 2

TNAV Modified Flight Plan for TNAV Test

| SEGDIST NAUT. MI. | SEGSPD KNOTS | CSS | ETA HHMM.M | RTA HHMM.M |
|---|---|---|---|---|
| 10.0 | 250.0 | | 0002.4 | |
| 10.0 | 250.0 | | 0004.8 | |
| 35.0 | 270.0 | CSS | 0012.6 | |
| 100.0 | 314.3 | | 0031.7 | |
| 20.0 | 290.0 | CSS | 0035.8 | |
| 70.0 | 300.0 | CSS | 0049.8 | |

TABLE 2-continued
TNAV Modified Flight Plan for TNAV Test

| SEGDIST NAUT. MI. | SEGSPD KNOTS | CSS | ETA HHMM.M | RTA HHMM.M |
|---|---|---|---|---|
| 400.0 | 334.3 | | 0201.6 | |
| 200.0 | 344.3 | | 0236.5 | |
| 200.0 | 314.3 | | 0314.7 | |
| 100.0 | 309.3 | | 0334.1 | |
| 35.0 | 309.3 | | 0340.8 | |
| 100.0 | 314.3 | | 0359.9 | |
| 20.0 | 324.3 | | 0403.6 | |
| 70.0 | 334.3 | | 0416.2 | |

TABLE 2-continued
TNAV Modified Flight Plan for TNAV Test

| SEGDIST NAUT. MI. | SEGSPD KNOTS | CSS | ETA HHMM.M | RTA HHMM.M |
|---|---|---|---|---|
| 400.0 | 334.3 | | 0528.0 | 0528.0 |
| 200.0 | 310.0 | | 0606.7 | |
| 200.0 | 240.0 | | 0656.7 | |
| 100.0 | 240.0 | | 0721.7 | |
| 50.0 | 235.0 | | 0734.5 | |

SEGDIST = Distance of the flight plan segment (leg)
SEGSPD = Speed to be used in the flight plan segment
CSS = Constant Speed Segment
RTA HOURS = Requested time of arrival, in hours elapsed since start of flight

13 Claims, 4 Drawing Sheets

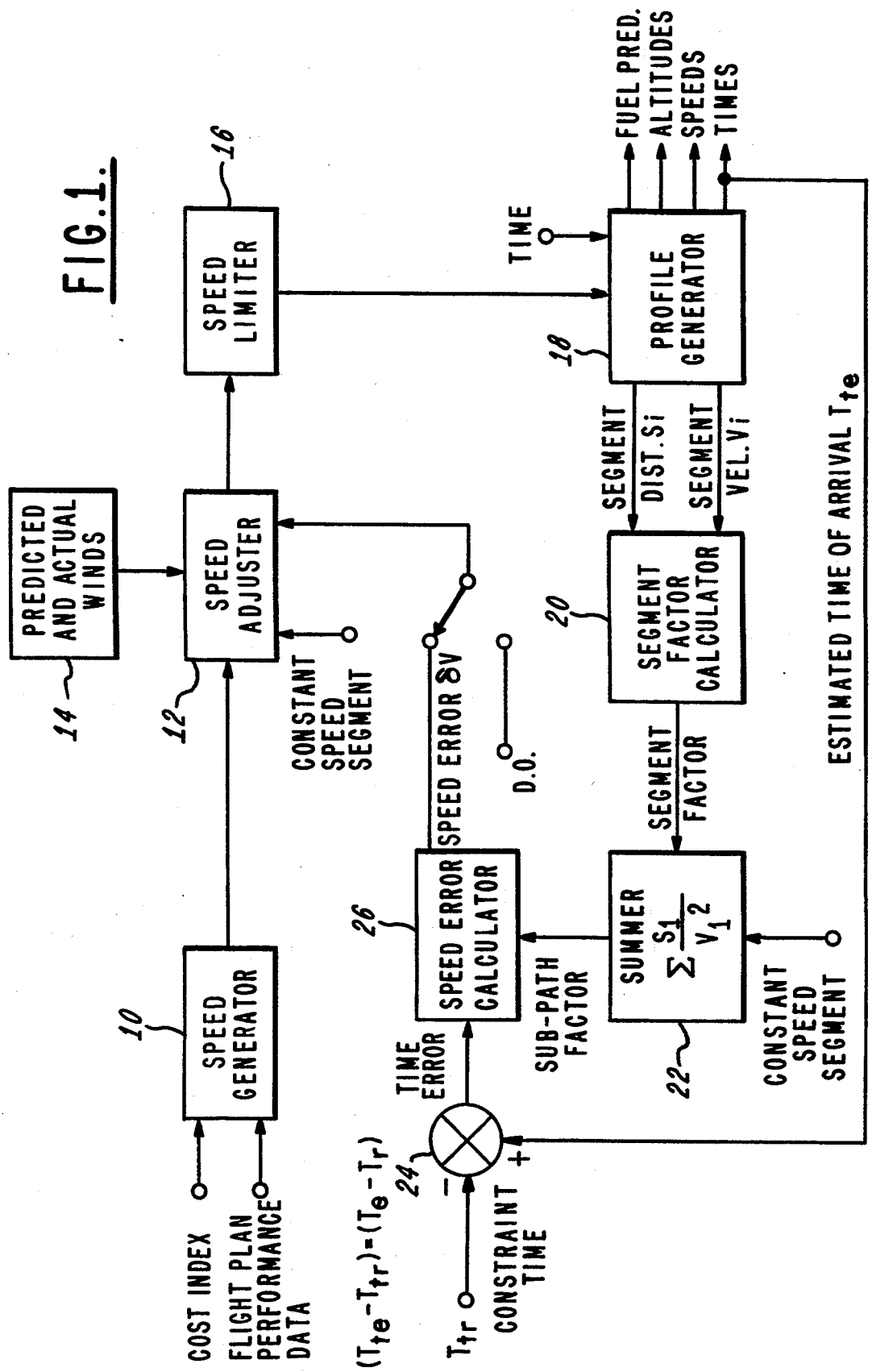

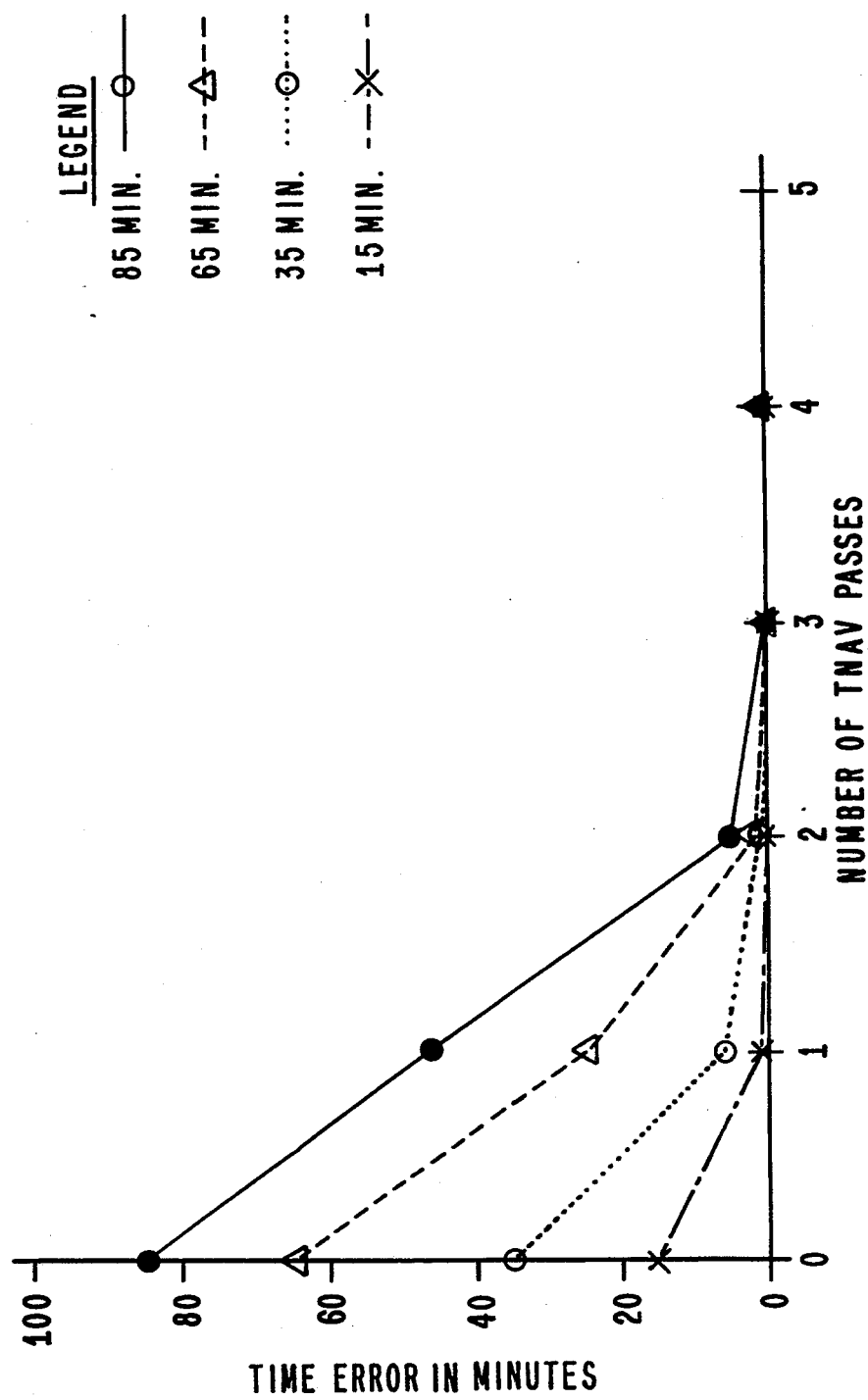

APPARATUS AND METHOD FOR CONTROLLING AN OPTIMIZING AIRCRAFT PERFORMANCE CALCULATOR TO ACHIEVE TIME-CONSTRAINED NAVIGATION

The U.S. Government has rights in this invention pursuant to Contract No. F33657-87-C-2084, awarded by the Department of the Air Force.

BACKGROUND OF THE INVENTION

1. Field of the Invention

The invention relates to Flight Management Systems for aircraft, and in particular to an apparatus and method whereby time-constrained flight can be achieved while maintaining predetermined input parameters selected for minimizing cost of flight, wherein arbitrary points in the flight plan can be designated as time-constraint points, and wherein flight segments can be arbitrarily selected for exclusion from any speed variation.

2. Description of the Prior Art

A Flight Management System (FMS) provides the crew of an airplane with extensive capabilities for planning and carrying out the flight of their aircraft. One of the principal goals of the modern FMS is to optimize the cost of the flight, based on a predetermined set of parameters. In current practice these parameters are specified so that they define the actual cost in fuel and flight time for a given flight plan. These parameters are determined carefully so that they match the performance characteristics of the aircraft under consideration as closely as possible. The result of this exercise in optimization is a flight plan that contains target altitudes and speeds for each leg or segment of the flight. However, since the objective is to provide an optimum flight plan (i.e., a minimum cost of flight), the time of arrival at any destination is a result of the optimization calculations, and therefore will not necessarily match any desired arrival time, which may be constrained by factors such as costs of crew time, need to match schedules of connecting flights, and air traffic control metering fixes.

The difficulty caused by this approach is found in the pragmatic necessity for a flight to reach a destination, whether it be an interim waypoint or a final destination, at a predetermined time. Requirements for such time constraints are seen in the need to arrive at an oceanic gateway within a specified time window, or the need to arrive at an airport at a specified time in order to be allowed access to the terminal. Many other requirements for time constrained navigation can be found in both the military and commercial arenas.

Any attempt to solve the problems presented by these time constraints will inherently involve the current estimated time of flight, the time of flight required by the time constraint or required time of arrival (RTA), the distance of the flight, and the speed of the aircraft. These parameters, along with those that were used to develop the original estimate of the flight time, provide the inputs that can allow for the adjustment of the flight to achieve the time constraint. In problems of this nature, the standard engineering practice has been to utilize feedback control systems to provide the solution. This method allows the system developers to approximate the activities of the system by the use of modeling techniques, and to introduce corrections through feedback to achieve desired goals.

Prior art methods and apparatus used in solving this problem did not utilize either the performance optimizer or feedback of the speed schedule into the flight profile predictions. This is illustrated in the approach taken by A. P. Palmeri in U.S. Pat. No. 4,774,670. This invention used the estimated time of arrival produced by the profile predictions to compute a time error. This time error was then applied to the cruise segment of the flight profile to obtain a speed error percentage. The speeds used in the cruise segment were then adjusted by this error percentage to obtain a new speed schedule.

The Palmeri invention was limited in a number of ways. First and foremost, the new speed schedule was not fed back into the flight profile predictor. The flight profile predictor would continue to display fuel predictions based upon the original speed schedule, not the newly generated one. Secondly, the speed schedule was only adjusted during the cruise portion of the flight. Short flights may require adjustments to the climb and descent portions to enable the system to meet the required time of arrival. Third, this approach did not allow for multiple time constraints, which are often used in transoceanic flights. By treating the cruise segment as a whole, and not the individual legs that make it up, it is not possible to adjust these legs individually. Along these same lines, constant speed segments, which are also often used in transoceanic flights, would not be permitted.

Another prior art solution for this problem has been to vary the parameters used to define the original optimization in such a way that the desired time of arrival is achieved. See, for example, U.S. Pat. No. 4,760,530, invented by S. P. Liden and assigned to the assignee of the present invention, and M. K. DeJonge in U.S. Pat. No. 5,121,325, which utilize a form of variable cost index prediction. This serves to dilute the optimal character of the resultant flight, since the parameters used to determine the optimum cost are no longer those being used to achieve the desired destination time. The flight plan that results from these new parameters is suboptimal, when considered in the light of the original flight plan.

Additional difficulties occur when this approach is implemented. It is not always clear which parameters should be selected and changed so that the resultant flight path achieves its desired time constraint. In fact, the choice of parameters to vary is arbitrary. Further, the exact result of a variation of a selected parameter is not predictable with any degree of assuredness. Instead, such gross measures as the direction of the "correction" is often in question and the effect is seldom monotonic; in fact, the magnitude of the correction can vary throughout the computation cycle. This lack of essential monotonicity leads to extended computations and often results in limit cycles that require testing and termination control.

The introduction of more than one time constraint in practical flight plans introduces still another difficulty. None of the current methods that approach the time-constrained navigation problem by varying the parameters that feed the cost function address this situation. To do so would defeat the nature of the optimized flight even further, and would increase the complexity by requiring optimization calculations to be performed over flight segments. This approach would clearly be non-optimal, and the validity of the optimization computations would be placed in question.

Alternative solutions, including the approach taken by Palmeri, have been proposed that treat the problem from the point of the global speed ratios. These solutions have used a ratio developed from each speed in the cruise segment to achieve the single objective presented by the specified arrival time. No consideration is given to the very pragmatic inclusion of constant speed segments, or to passenger comfort, or to the usual requirement for including several time constraints in a single flight plan. The time variation for a single flight plan leg is individually computed, and, since it is independent of the preceding and following legs, the speed match can easily be seen to be neglected. It is this speed match that will cause the passengers in an airline that does not perform it well to choose another form of travel. Additionally, the approaches noted have not addressed the computational difficulties associated with their solutions, involving oscillation of the solution, without the inclusion of complex mechanisms for controlling these limit cycles.

These problems suggest a search for an approach that will alleviate the calculation complexity, yield monotonic closure on the desired time constraint, provide a smooth speed variation, and still remain close to the original optimized flight path. The present invention is such an approach. It provides time constraints for an arbitrary number of legs of the flight plan, whether designated as constant speed or variable speed, without modifying the input parameters determining the optimal cost of flight. A single speed adjustment factor is applied over a given time constraint sub-path, which may be comprised of a combination of constant speed and variable speed legs, and provides for rapid settling to a required time of arrival without significantly impacting the processor requirements of an existing flight management system.

SUMMARY OF THE INVENTION

The invention provides an apparatus and method for use with a flight management system for applying an arrival time constraint to at least one of a plurality of flight segments of a given flight plan while inputting a predetermined cost index. The flight plan is applied to a profile generator which is also responsive to a speed input signal. The flight plan defines a plurality of flight segments and by simulating the performance of the aircraft, the profile generator provides an estimated time of arrival signal computed from the speed input signal. A summing junction computes the difference between the estimated time of arrival signal and a given arrival time constraint and provides a first difference signal representing a time error. A summer provides time duration signals derived from the profile generator corresponding to the plurality of flight segments defined by the flight plan, thereby providing a total arrival time signal corresponding to a summation of the time duration signals comprising the segments of a sub-path. A speed error calculator provides a quotient of the time error signal and the total arrival time signal for computing a speed error adjustment signal. This provides an incremental or decremental speed error adjustment to vary the speed input signal which is applied to the profile generator for updating the total time of arrival signal and the estimated time of arrival signal. By repetitively recomputing the total arrival time signal and the estimated time of arrival signal, the estimated time of arrival signal is monotonically urged to substantial coincidence with the given constraint time of arrival, whereby the speed error signal is reduced to a nullity.

BRIEF DESCRIPTION OF THE DRAWINGS

FIG. 1 is a conceptual block diagram of the time constrained navigation system of the present invention.

FIG. 3 is illustrative of time error vs. the number of TNAV passes required to reduce the time error to an acceptable value for representative time error values.

DESCRIPTION OF THE PREFERRED EMBODIMENT

Figure 2A:
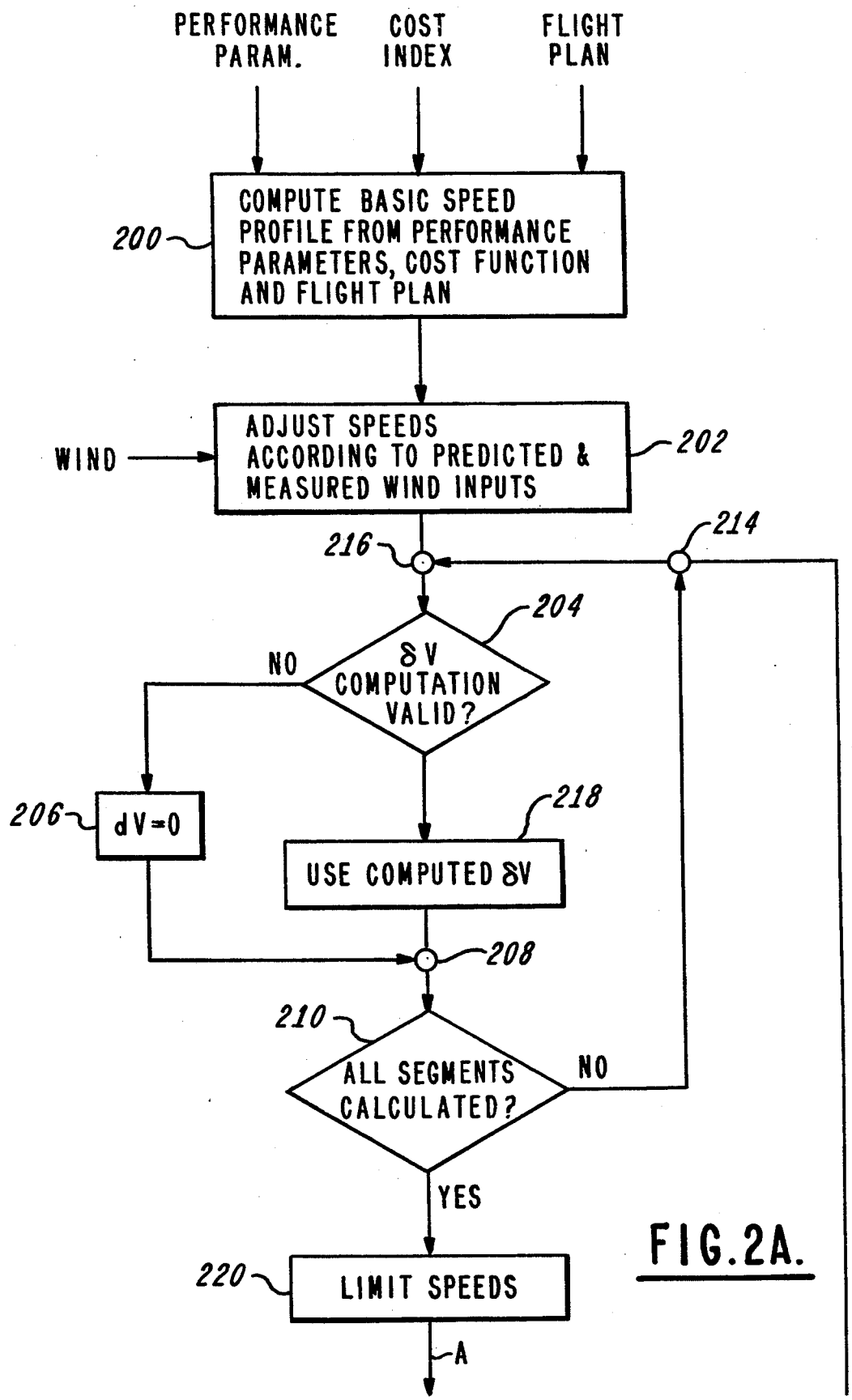
FIG. 2 is a functional flow diagram illustrating the operation of the present invention.

Before presenting the detailed description of the apparatus and method of the present invention, a brief overview of the operation of the present invention is presented. The performance of an aircraft through a specified flight profile can be measured by establishing relationships that allow for the determination of the cost of flying that profile. This measurement can then be maximized by changing the criteria used to determine the flight profile, recalculating the profile, and observing the effect on its costs. One of the criteria that can be used in this manner is the time required to travel from an origin point to a destination that follows it in the profile. Constraining the flight profile such that the aircraft will arrive at a specified point at a specified time is the time-constrained navigation problem, also known as 4-D control.

This method for achieving time-constrained navigation (TNAV) involves controlling the optimal performance calculation with specified input time targets, without resorting to alteration of any of the input parameters that were used in the original optimization calculation. These time target inputs are specified for the flight profile between any time-constraint origin and its time-constraint destination. A speed error generator then computes the required variation in speed for each leg of the flight plan that is involved in the time constrained flight, and provides a ground speed adjustment that can be used to control the aircraft in achieving the time constraint. The result is a small variation on the original optimized flight profile that represents a step toward the time constraint. Sequential applications of the performance calculation and the time constraint target generation cause rapid closure on the desired speed/altitude/time profile. The final flight profile is a constrained optimal path from the origin to the destination, which is seen to be a variation on the original optimal path.

In the present invention, the first TNAV calculation for any sub-path results in a speed variation over the time-constrained sub-path that reduces the time error. This time error is the difference between the requested arrival time at the end of the sub-path, and the estimated arrival time at that same point. If the time error is greater than desired, a second TNAV calculation will reduce it further. These calculations are monotonic in magnitude, and therefore the closure on the desired result is assured. In practice, it has been seen that the average number of TNAV cycles is less than 2.

The computational complexity of the TNAV calculation is low. It does not require the re-optimization of the flight path or the execution of any of the optimization procedures. Instead it can be used to supplement these procedures to provide further capability for the FMS.

The method described herein has been successfully applied to commercially available flight management systems, such as the Honeywell Flight Management Computer System for the Boeing 757/767 aircraft, Honeywell Air Transport Systems Division part number 4052500. It is also applicable as a modification to the Honeywell Performance Computer System, available from Honeywell Business and Commuter Avionics Systems Division as part numbers PZ-800 and SPZ-8000.

The present invention may be implemented by using conventional analog circuitry and computational techniques or by using conventional wholly digital techniques or by using conventional hybrid digital/analog techniques. To simplify the understanding of the invention, it will be explained by using a generally analog format as shown in FIG. 1, it being understood that the same analog format may also represent, in block diagram form, the program of a programmable digital computer wherein the various analog inputs are converted to digital signals for digital processing and the various digital outputs are converted to analog signals for activating control functions. In this illustration the elements of the system are shown as boxes, with their functions given in abbreviated form in the respective boxes. In this figure the functional paths are also shown, with the information flow stated on each path. The arrowheads for each path indicate the direction of flow of the information. The primary functioning of the system is detailed in the following paragraphs.

Referring now to FIG. 1 there is shown a block diagram of the preferred embodiment of the time-constrained navigation system. At some point in the planning of the flight, the factors that influence the cost of the flight are specified by the operator. These factors normally include the time duration of the flight and the amount of fuel that will be consumed and may be reflected as a cost index parameter. These and any other factors that are being used to perform the flight path optimization are input to a Speed Generator 10. In addition the flight plan, including origin, destination, and any definable points along the way, is input to the Speed Generator 10. The Speed Generator 10 uses its aircraft model and the parameters that have been input to it to determine the initial speeds for each leg of the flight plan.

The Speed Generator 10 creates a schedule for the speed of each leg of the flight plan, including (in many applications) climb and descent portions. This schedule is fed to a Speed Adjuster 12. The Speed Adjuster 12 accepts both the schedule and the measured and estimated winds for all points on the flight path. With these data the Speed Adjuster 12 computes the adjustment required in the current aircraft speed to achieve the schedule. This adjustment is fed to a Profile Generator 18 through a Speed Limiter 16. The Speed Limiter 16 contains speed and altitude presets and limits that preclude feeding a dangerous or unattainable speed to the Profile Generator 18.

The Profile Generator 18 performs several separate tasks in the subsystem. The first task undertaken by this module is the simulation of the flight path, using the speed schedule and flight plan altitudes as its primary inputs. In this simulation the aircraft is mathematically flown through each leg of the flight plan. This allows the Profile Generator 18 to estimate the fuel consumption at any point in the flight plan, as well as the altitude that will achieve minimal fuel consumption.

The next task is to provide the aircraft subsystems with the data from the simulated flight. These data include the estimated speeds, altitudes, and fuel consumptions for each leg of the flight plan. These outputs of the Profile Generator 18 are used by the aircraft subsystems to control the aircraft so as to achieve the desired flight characteristics of optimum cost, speed, and fuel consumption.

The final task of the Profile Generator 18 is to provide the feedback of distance and velocity from the adjusted flight plan to the time constraint calculator, Segment Factor Calculator 20. The data are sent to Segment Factor Calculator 20 for each segment in the adjusted flight plan. This is the initial function of the Time-constrained Navigation Subsystem (TNAV).

The Segment Factor Calculator 20 computes the time required to traverse each segment from the well known relationship $S=V*T$, where S represents distance, V represents a rate, and T represents time, computes the ratio of the distance S to the rate V squared, and passes this information on to the Summer 22, which sums all of the segment times to obtain a further arrival time computation which represents the total flight time, excluding the constant speed segments. Constant speed segments are those legs of a flight plan wherein the speed can not be varied from the a priori selected speed. During this calculation, any segment that has been designated as a constant speed segment is subtracted from the total flight time. This calculation is carried out for the segments between each point in the flight path that is designated as a time-constraint origin and its designated time-constraint destination. These are called time-constraint sub-paths, or sub-paths. Note that in this implementation time-constraint sub-paths are not allowed to overlap each other, but they can form a contiguous path. Also note that an arbitrary number of constant speed segments can be included in each sub-path.

The calculations performed by the Segment Time Calculator 20 and the Summer 22 are as follows. Given flight profile segments from the Profile Generator 18 with the distance $S_i$ and speed $V_i$ for the ith segment, the estimated total arrival time $T_{te}$ at the sub-path destination is $$T_{te} \Sigma [S_i/V_i], \tag{1}$$

where the summation is taken over the segments in the sub-path, including any constant-speed segments.

Certain assumptions can now be made that will simplify the problem of determining an adjustment to the speed profile that will allow the aircraft to achieve the desired time constraints in the flight plan. These assumptions serve to linearize the problem, and to create a workable approach to the solution that consists of a monotonic variation that will be applied as a correction factor to the speed profile. In order to do this, we note that the variations in speeds required to meet the required time constraint, $T_r$, also cause a small variation in some of the distances of the segments. The total required (or constrained) time can be written as $$T_{tr} = \Sigma[(S_i + \delta S_i)/(V_i + \delta V_i)] + \Sigma T_{ci} \tag{2}$$

or $$T_{tr} = T_r + \Sigma T_{ci}$$

where $\delta S_i$ and $\delta V_i$ are the variation in segment distance and speed, respectively; $T_r$ is the sum of times over the non-constant speed segments, and the $T_{ci}$ are the constant speed segment times. This total required time includes any constant-speed segments that may be present in the sub-path. The constant-speed segments will be excluded from calculations for the speed adjustment, since the speeds in those segments may not be adjusted.

At this point it is noted that the variations in speed and distance for each segment are smaller than the base speed and distance for that segment. That is, $$\delta V_i < V_i \quad (3)$$

and $$\delta S_i << S_i$$

Equation (2) can be solved for $T_r$ and can then be rewritten by proceeding to eliminate all terms of second order or higher.

$$T_r = \Sigma[(S_i + \delta S_i)/(V_i + \delta V_i)]$$

or $$T_r = \Sigma[S_i/(V_i + \delta V_i) + \delta S_i/(V_i + \delta V_i)]$$

But the second term of the right-hand member is $$\delta S_i/(V_i + \delta V_i) = \delta S_i/(V_i(1 + \delta V_i/V_i))$$

which, since $\delta V_i < V_i$, may be shown by a Taylor series approximation ti be $$\approx (\delta S_i/V_i)(1 - \delta V_i/V_i))$$

or $$\approx (\delta S_i/V_i) - (\delta S_i \delta V_i/V_i^2)$$

The second term vanishes because it is of second order, and the value of $T_r$ becomes $$T_r = \Sigma[(S_i)/(V_i + \delta V_i)]. \quad (4)$$

Before proceeding, some concerns of practical flight planning and execution must be considered. One primary objective in flight planning and execution is to perform the flight safely, and in relative comfort. This translates in the present case to the requirement for a minimal number of speed changes through the course of the flight; a practical, effective system must not cause "jockeying" of the throttles throughout the flight. This requirement for a relatively consistent aircraft speed leads to the conclusion that the variation in speed required to achieve the time-constrained navigation should consist of small, consistent variations about the original speed profile. Speed variations of this type can be generated by noting that the incremental speed variation can be written as two elements: a constant value and a variable value. Thus for any non-constant-speed segment, $$\delta V_i = \delta V + \epsilon_i.$$

In this expression the $\epsilon_i$ have been restricted to small variations in the speed, whose result is at most second order. Therefore, $\delta V_i$ can be set equal to $\delta V$ for all segments, and the second order contribution of $\epsilon_i$ can be eliminated.

Expanding the expression for the required constraint time results in $$T_r = \Sigma[(S_i)/(V_i + \delta V + \epsilon_i)].$$

or $$T_r = \Sigma[(S_i)/V_i(1 + \delta V/V_i + \epsilon_i/V_i)].$$

But the term $\epsilon_i < \delta V$, and $\delta V < V_i$, so that $\epsilon_i << V_i$ so that the expression for $T_r$ can be rewritten as $$T_r \approx \Sigma[(S_i)/V_i(1 + \delta V/V_i)],$$

or $$T_r \approx \Sigma[(S_i/V_i)(1 - \delta V/V_i)]$$

hence $$T_r = \Sigma(S_i/V_i) - \delta V \Sigma(S_i/V_i^2)$$

Solving for $\delta V$ and replacing the first summation by its result, $T_e$, $$\delta V \approx [(T_e - T_r)/(\Sigma(S_i/V_i^2)] \quad (5)$$

where $T_e$ is derived from the total estimated arrival time $T_{te}$, and the summation is taken over all segments that are not constant speed.

For each required arrival time (sub-path) throughout the flight plan, the $\delta V$ values are computed by the Speed Error Calculator 26. As is seen in equation (5), these values are obtained from the Time Error inputs and the inputs from Summer 22.

The Constraint Time inputs to the system are applied to Summing Junction 24 where the estimated segment arrival times computed by Profile Generator 18 are then subtracted. These differences are summed over a sub-path to yield the sub-path Time Error $(T_e - T_r)$ in equation (5) above. The sub-path Time Error is the value that serves as the input to the Speed Error Calculator 26. This is just the difference between the prior "optimal" time required to traverse the sub-path and the desired time required to traverse that same path. The denominator in equation (5) above is the Sub-Path Factor, and is obtained directly from the output of the Summer 22. Its value is $\Sigma(S_i/V_i^2)$.

These values for incremental speed target adjustment obtained from equation (5) are successively applied to each segment of the flight profile (except the constant speed segments) and the resultant constrained profile is sent to the Speed Adjuster 12, which then handles any limits and aircraft or safety constraints, as before. The result of this application is a flight profile that is optimized on a segment-by-segment basis, is near to the initial optimized profile, and which will meet the time constraints within the limits of the flight characteristics of the aircraft and the limits of flight rules.

Figure 2B:
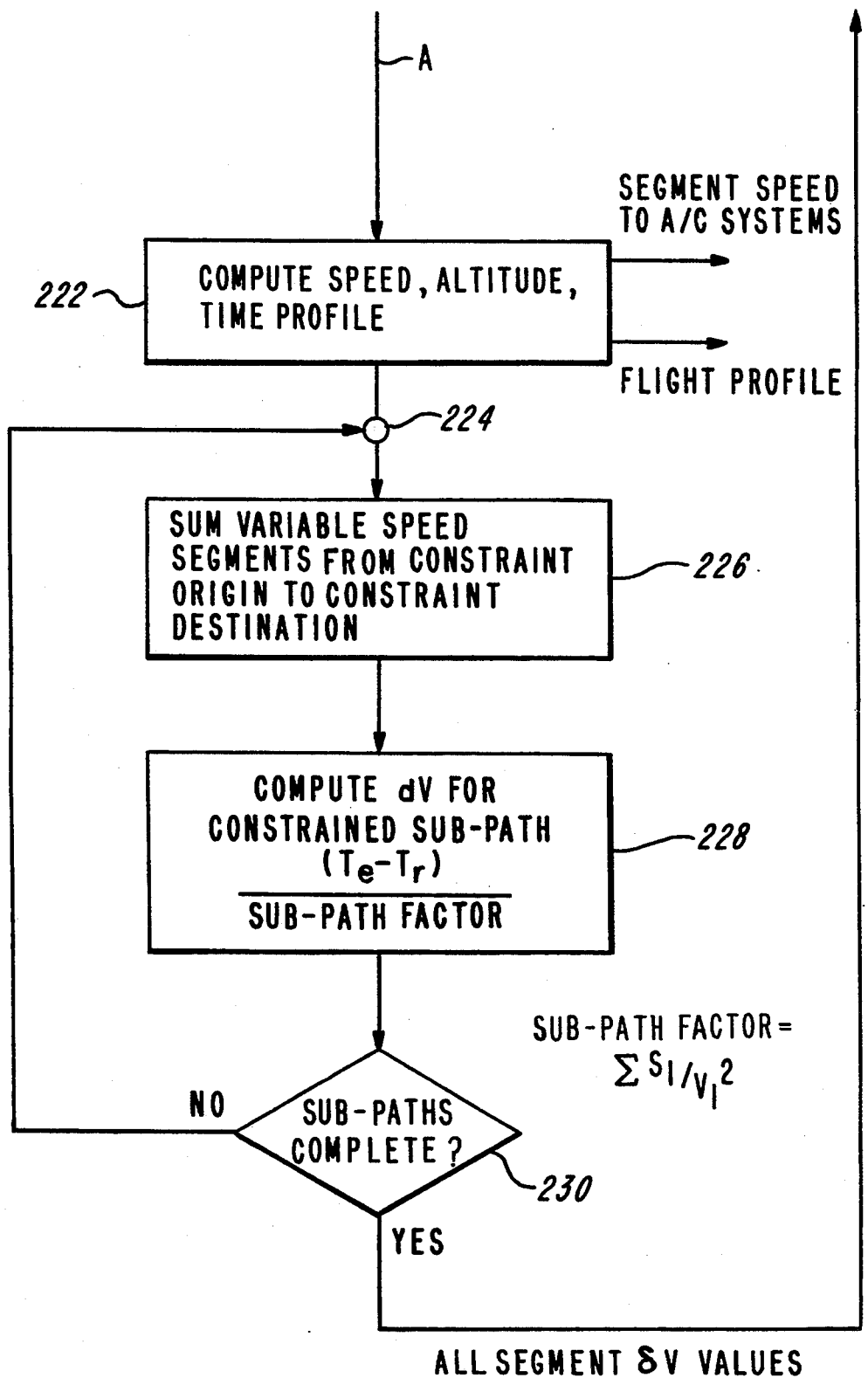

The functional flow of the implementation is shown in FIG. 2. As for FIG. 1, the diagram is simplified to show one time constrained sub-path. The implementation for multiple sub-paths is performed by repeating the major loop for each sub-path. The values of $\delta V$ that result are fed back as inputs to the speed calculation. These speeds are then limited and the results are used to obtain the speeds for each segment of the flight profile. The segment speeds are the primary output of the system, and are used by the aircraft systems to adjust the speed and achieve the desired arrival time.

In operation, block 200 receives inputs from the performance parameters, the cost index, and the flight plan. A basic speed schedule is computed and applied to block 202, where the speed is adjusted for wind characteristics during flight. The adjusted speed is applied to block 204, where it is tested for the presence of a speed error signal $\delta V$. On the initial pass there will be no speed error signal, and the output will go to block 206 and then to node 208. The signal on node 208 is transmitted to block 210, which tests whether all segments have been calculated. If the calculation is incomplete, the loop returns to nodes 214 and 216 and down to speed limited 220 when all initial segment calculations have been completed. The intial speeds are limited in block 220 as previously described. The output of limiter 220 is coupled to block 222, where the speed, altitude, and time profile are computed and provided to the aircraft control and display systems. The distance and velocity values for all time constrained segments are coupled from node 224 to block 226, where they are summed and the sub-path factor computed. The output of block 226 is coupled to block 228, which also receives the time error computation to derive the speed error factor $\delta V$.

The loop is tested for computation of all sub-paths in block 230. If incomplete, additional subpaths are routed to node 224 for computation. When all sub-path computations have been completed, the output of block 230 is returned to node 21 6 where a speed adjustment is made and the output thereof is coupled to block 222 for recomputation. This cycle is repeated for each time constrained segment in the flight plan until the speed error is reduced to a nullity whereupon the sub-path time of arrival will substantially coincide with the required time of arrival.

One implementation of the speed adjustment consists of coupling the speed output of the time-constrained navigation subsystem to the input of an autothrottle subsystem and the altitude output to a flight director display. In this configuration the autothrottle maintains the speed that is commanded for each segment of the flight plan, including any time-constrained sub-paths, while the flight director display acts as an advisory to the pilot. The TNAV calculation is performed on a periodic basis so that a new speed schedule can be obtained that is based on the current aircraft situation.

Another implementation presents the TNAV speed output to the FMS displays. In this implementation, the pilot uses the speed presentation as advisory data, and may choose to fly at or near the advised speed. Here the TNAV calculation is performed throughout the flight, so that the advisory speeds presented to the pilot will reflect his current ability to achieve the time constraints.

Operation of the TNAV system of the present invention may be illustrated by a set of typical flight plans were constructed for testing the subsystem. On such flight plan is shown in Table 1. This flight plan is the input to the time navigation calculator. The left column (SEGIST) contains the distance for each flight plan segment in nautical miles; the second column (SEDSPD) contains the "optimized" speed for each segment in knots. The third column designates any constant speed segments (CSS). The speed for these segments is required to remain constant, and so is not varied by the TNAV subsystem, The fourth column shows the Estimated Time of Arrival (ETA) in hours, minutes, and fractions of a minute. The last column shows the requested arrival time, i.e., the constraint time. It is this time that the TNAV subsystem will achieve through its variation of the speed schedule. The time error is the difference between the estimated time and the time constraint.

The result of application of the time navigation system is shown in Table 2. The leg speeds and times reflect the action of the time navigation system on the original flight plan. It should be noted that 1) the speeds in the Constant Speed Segments remain unchanged, and 2) the speeds of the first two legs of the flight plan received less correction than the remaining legs due to the speed/altitude limits imposed on those legs.

FIG. 3 shows the result of the application of the TNAV subsystem to the flight plan of Table 1. Four different constraint times were used. These constraint times resulted in initial time errors of 85 minutes, 65 minutes, 35 minutes, and 15 minutes, corresponding to constraint times of 448 min, 428 min, 398 min, and 378 min. The task of the TNAV subsystem is to reduce these errors to allowable values. Thus, for an initial time error of 85 min, one pass through the TNAV system reduced the arrival time error to 45 min, two passes reduced the arrival time error to 5 min, and there was substantially zero error at 3 passes. With an initial arrival time error of 65 min, the error was reduced to 25 min in one pass, 1 min in two passes, and zero in 3 passes. For an arrival time error of 35 min, after one pass the arrival error was 5 min and zero after two passes. With an initial error of 15 min, the arrival time error was less than 1 min on the first pass. Thus, it may be seen that the results converge rapidly, and in a monotonic fashion, without oscillations between early and late arrival times for the range of assumed values. Similar results obtain with negative RTA errors (i.e, early arrival). The resultant data demonstrate closure on the requested time of arrival even for the cases where the time error exceeds 10% of the estimated time. In fact, the 85 minute time error is approximately 25% of the initial estimated time. Under these extreme conditions, the TNAV subsystem still demonstrates rapid closure, requiring only 4 cycles to obtain zero error. In practice, a constraint is usually achieved when the time error is less than 1 minute, so the 85 minute time error would require only three cycles, the 65 minute time error would need two cycles, and the 35 minute and 15 minute time errors would require one cycle.

While the invention has been described in its preferred embodiments, it is to be understood that the words which have been used are words of description rather than limitation and that changes may be made within the purview of the appended claims without departing from the true scope and spirit of the invention in its broader aspects.

The embodiments of an invention in which an exclusive property or right is claimed are defined as follows:

1. Apparatus for use with an aircraft flight management system for achieving time constrained navigation, comprising:
    means for storing a predetermined cost index, a flight plan, wind conditions, and aircraft performance data for a given aircraft,
    means for converting speed input data to a speed control signal in accordance with said cost index, flight plan, wind conditions and aircraft performance data, and means for applying said speed control signal to control the speed of said aircraft, further comprising:
(a) means responsive to said stored cost index, flight plan and aircraft performance data for providing an initial speed signal for each leg of the flight plan,
(b) a profile generator responsive to said speed input signals, for executing said flight plan defining a plurality of flight segments comprising a sub-path and for providing an estimated time of arrival signal and said speed control signal,
(c) junction means for comparing said estimated time of arrival signal with a given arrival time constraint and for providing a first difference signal representative of a time error thereof,
(d) segment factor calculator means for providing time duration signals defined by a function of distance and velocity derived from said profile generator and corresponding to said plurality of flight segments,
(e) summer means for providing a total arrival time signal corresponding to a summation of said time duration signals, and for excluding constant speed segments therefrom,
(f) speed error calculator means responsive to a function of said first difference signal and said total arrival time signal for computing an incremental or decremental speed error signal, and
(g) speed adjuster means for applying said speed error signal to said profile generator for repetitively modifying said total arrival time signal and said estimated time of arrival signal until said estimated time of arrival signal is monotonically urged to substantial coincidence with said given constraint time of arrival, whereby said speed error signal is reduced to a nullity, and
(h) means responsive to said profile generator for applying said speed control signal to control the airspeed of said aircraft, whereby a given arrival time is achieved for each of said plurality of flight segments, thereby to control the speed of said aircraft so as to achieve a required time of arrival while minimizing costs and maximizing passenger comfort.

2. Apparatus as set forth in claim 1, further comprising: speed generator means for receiving said predetermined cost index, said flight plan, and said performance parameters representative of said aircraft, for providing an initial speed schedule for each segment of said flight plan, and for generating signals corresponding thereto,
a data base for storing data representative of predicted and actual wind velocities,
said speed adjuster means being responsive to said speed schedule signals, to said wind velocity data base, and to said speed error signal, thereby to modify said initial speed schedule signals for each segment of said flight plan substantially in a uniform manner in accordance with said speed error signals, and
speed limiter means for storing the magnitudes of unsafe and unattainable speed limits and responsive to said modified initial speed schedule signals for applying said stored minimum and maximum speed limits thereto in accordance with said aircraft performance parameters.

3. Apparatus as set forth in claim 2, wherein said profile generator is responsive to said speed limiter means for sequentially defining a distance signal and a velocity signal associated with each segment of said flight plan and for periodically modifying said defined distance and velocity signals in accordance with variations in said limited speed schedule signals.

4. Apparatus as set forth in claim 3, wherein said segment factor calculator means is responsive to said modified and limited segment distance and segment velocity signals from said profile generator for providing an output signal proportional to a ratio thereof, which signal is representative of a time to traverse each of said segments.

5. Apparatus as set forth in claim 4, wherein said ratio is of the form $$(S_i/V_i^2)$$

where
$S_i$ = ith segment distance
$V_i$ = ith segment velocity.

6. Apparatus as set forth in claim 5, wherein said speed error calculator means provides an output proportional to a ratio of said time error signal to said total time of arrival signal, and where said ratio is of the form $$(T_e - T_r)/\Sigma(S_i/V_i^2)$$

where
$T_e$ = estimated arrival time of non-constant segments in sub-path
$T_r$ = required time of arrival summed for non-constant segments
$S_i$ = ith segment distance
$V_i$ = ith segment velocity.

7. Apparatus as set forth in claim 6, wherein said profile generator is responsive to a flight plan providing a plurality of arbitrary points designated as time-constrained sub-paths, and wherein segments of said time-constrained sub-paths are comprised of variable speed segments and constant speed segments, and wherein any of said segments may be arbitrarily selected for exclusion from speed variation by a control signal applied to said summer means.

8. Apparatus as set forth in claim 7, wherein a common speed adjustment is applied by said speed adjuster means to each of said variable segments in a given sub-path.

9. The apparatus as set forth in claim 1, wherein said means for applying said modified speed control signal is the autothrottle of an autopilot of said aircraft.

10. The apparatus as set forth in claim 1, wherein said profile generator provides a speed advisory signal to a flight display instrument for display to a human pilot, and said pilot controls a manual throttle of said aircraft in accordance therewith.

11. The apparatus as set forth in claim 10, wherein said profile generator provides an altitude advisory signal to a flight display instrument for display to a human pilot, and said pilot controls the altitude of said aircraft in accordance therewith.

12. The apparatus as set forth in claim 11, wherein said profile generator provides a fuel advisory signal, and further comprising means for displaying said fuel advisory signal to provide an indication of fuel consumption over each leg of said flight plan and of the remaining fuel supply.

13. A method for time-constrained navigation of an aircraft, comprising the steps of:

storing in a data base a flight plan defining at least one flight segment having a time-constrained origin and a time-constrained destination point, a plurality of time-constrained segments comprising a sub-path, storing in said data base a predetermined cost index representative of at least fuel costs and crew labor costs, storing in said data base a family of performance data representative of a given aircraft, applying said stored flight plan, said stored cost index, and said stored performance data to a speed generator for deriving, storing, and providing an initial speed schedule for each segment of said flight plan, providing a second data base of wind velocities corresponding to said flight plan, defining predetermined ones of said segments wherein a constant speed must be maintained and providing signals corresponding thereto, sequentially applying said speed schedule for each of said segments, said wind velocity schedule, and said constant speed signal to a speed adjuster for storing and providing a modified speed schedule in accordance therewith, applying said modified speed schedule to a speed limiter having stored therein the magnitudes of allowable speed limits for imposing maximum and minimum speed limits thereon to provide a limited speed schedule, said limited speeds representative of unsafe or unattainable speeds with said given aircraft, applying said limited speed schedule to a profile generator for executing a simulation of the flight path through each leg of the flight plan and for predicting required speeds and altitudes and for sequentially providing corresponding distance and velocity for each segment in accordance with said flight plan, and for further providing an estimated time of arrival, computing a plurality of time durations corresponding to a function of said predicted segment distance and velocity, applying said computed time durations to a summer for computing a summation of said time durations, excluding constant speed segments from said summation to provide a total time of arrival, comparing said estimated time of arrival with a predetermined constraint time and providing a difference thereof, applying said difference and said summation to derive a ratio corresponding to a speed error correction, applying said speed error correction to said speed adjuster for urging said estimated time of arrival to coincidence with said predetermined constraint time, and applying said predicted required speeds to control the airspeed of said aircraft, whereby a given arrival time is achieved for each sub-path.

* * * * *